United States Patent

[11] 3,554,469

[72] Inventors Robert J. Snow
 Newtown;
 Gregory Bochnak, Milford, Conn.
[21] Appl. No. 856,312
[22] Filed Sept. 9, 1969
[45] Patented Jan. 12, 1971
[73] Assignee United Aircraft Corporation
 East Hartford, Conn.
 a corporation of Delaware

[54] HIGH RESOLUTION CONTROL SYSTEM
 6 Claims, 2 Drawing Figs.
[52] U.S. Cl. .................................................. 244/83
[51] Int. Cl. .................................................. B64c 13/04
[50] Field of Search .................................... 244/83, 84,
 85, 86; 416/112

[56] References Cited
 UNITED STATES PATENTS
3,228,478 1/1966 Edenborough ............... 244/83X 3,396,597 8/1968 Dean .......................... 244/83X Primary Examiner—Milton Buchler
Assistant Examiner—Carl A. Rutledge
Attorneys—Maurice B. Tasker and Vernon F. Hauschild ABSTRACT: A high resolution control system for aircraft, such as a helicopter, in which a mechanical control system for translating motion from a pilot operated input member to a remotely located output member has a mechanical connection between the input member and the output member including a walking beam located adjacent the output member and means for providing a second input supplied directly to said walking beam in response to an electrical system producing an error signal by comparing a first signal generated in response to displacement of the input member with a feedback signal generated in response to displacement of the walking beam.

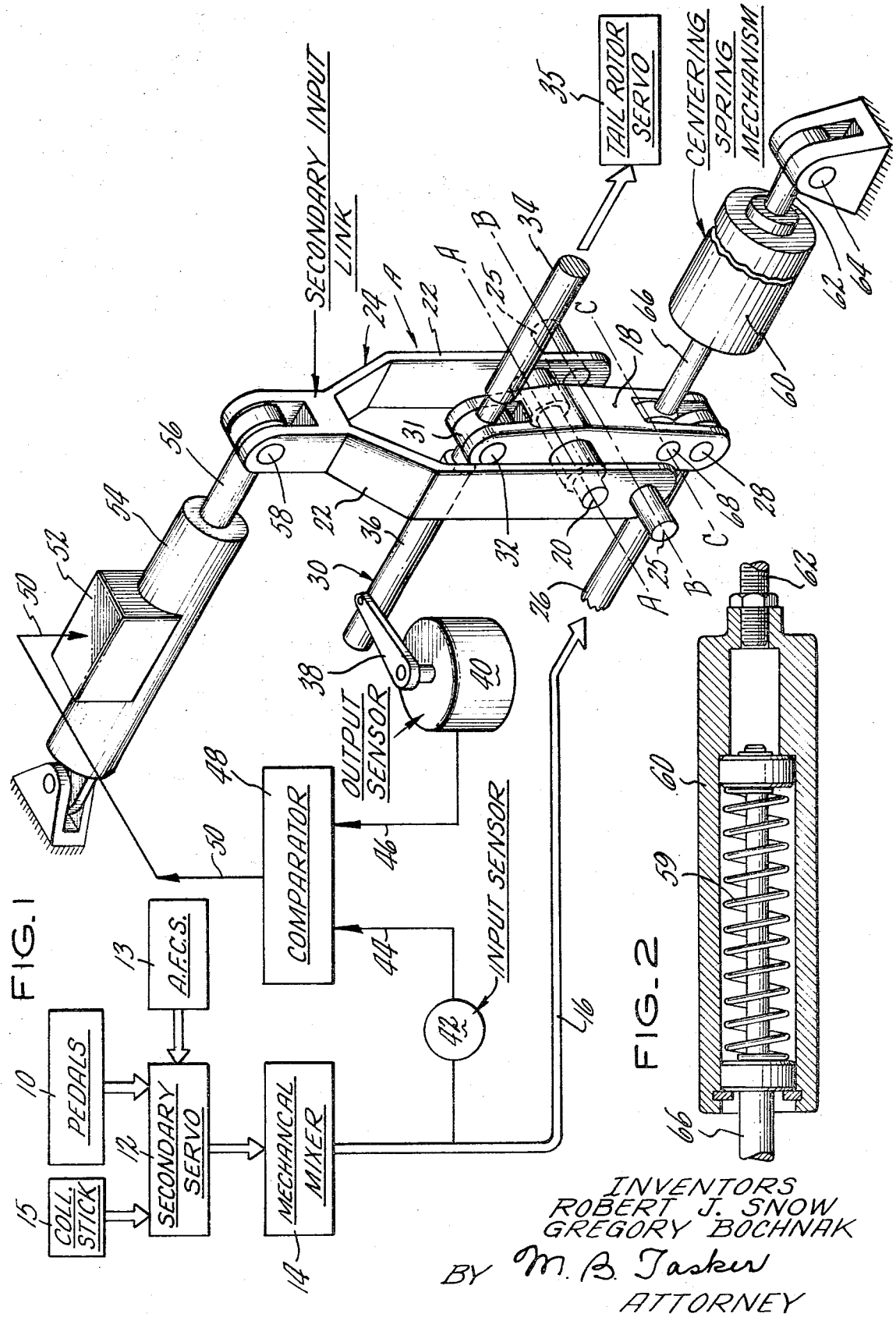

HIGH RESOLUTION CONTROL SYSTEM

The invention described herein was made in the course of or under a contract or subcontract thereunder with the Department of the Navy.

BACKGROUND OF THE INVENTION

Heretofore, control systems for moving an output member, such as improved blade resolution control member of a helicopter tail rotor, comprised a manually operable member located in the pilot's compartment driving, by means of cables and linkages, a hydraulic servoactuator located adjacent the tail rotor which positions the output member. Particularly in helicopter tail rotor control systems there is a large amount of lost motion, or backlash, due to the long mechanical linkage between the input and output members. Further, the long tail cone of a helicopter of the type utilizing an antitorque tail rotor flexes in flight and is also subject to thermal expansion and contraction, all of which results in a low relative correspondence between input and output in the control system.

SUMMARY OF THE INVENTION

A primary object of our invention is to provide an improved high resolution control system which compensates for lost motion and other mechanical and thermal induced variations between an input member and a remotely located output member.

Another object of our invention is to provide a high resolution control system which is basically mechanical, utilizing electrically sensed corrections which are applied, together with the mechanical controls, through improved differential mechanism located adjacent the tail rotor.

A still further object of our invention is to provide improved mechanism for introducing corrective input signals to the blade pitch control servomotor including a differential linkage.

Other objects and advantages of our invention will become evident from the following detailed description of the accompanying drawing.

BRIEF DESCRIPTION OF THE DRAWING

FIG. 1 is a schematic view of our improved high resolution control system as applied to the yaw control of a helicopter; and FIG. 2 is a longitudinal sectional view of a spring loaded centering device used in the system.

DESCRIPTION OF THE PREFERRED EMBODIMENT

Referring to the drawing, pilot operated pedals 10 drive the input of a secondary hydraulic servo 12. The automatic flight control system 13 also drives the input of secondary hydraulic servo 12. The output shaft of servo 12 is coupled with a mixing unit 14, the construction of which is shown and fully described in the Dean et al. U.S. Pat. No. 3,199,601. As is well known in the helicopter art, changes in the position of the collective pitch control stick 15 produce changes in the main rotor pitch which necessitates variation in the power output of the engine in order to maintain constant rotor speed. Resulting variations in engine torque are compensated for by introducing motion of the collective stick into the yaw channel to produce a corresponding change in tail rotor pitch. This mixing unit 14 is essentially a mechanical summing device.

The output of unit 14 is coupled through mechanical linkage 16, which extends from unit 14 adjacent the main rotor along the entire length of the tail cone, to a differential linkage, generally indicated at A, located adjacent the tail rotor. Differential linkage A includes a walking beam 18 having trunnions 20 which are pivotally mounted in the spaced arms 22 of a secondary input link 24, thus providing a pivotal support for the walking beam about axis A-A. Link 24 is pivotally mounted at 25 on fixed aircraft structure at the ends of arms 22 to provide for pivotal movement of link 24 about axis B-B.

Mechanical linkage 16 has a rear terminal link 26 which is pivotally connected at 28 to the lower bifurcated end of walking beam 18, thus providing mechanical input from the pilot's pedals to the differential linkage. The walking beam is also bifurcated at its upper end to receive a control rod 30 which extends both fore and aft beyond the walking beam and has an intermediate hub 31 which is pivoted at 32 in the upper furcations of beam 18.

The aft portion 34 of rod 30 is connected directly to the tail rotor servo 35. The forward portion 36 is connected to the operating arm 38 of an electrical yaw control system output displacement sensor 40. At the other end of the mechanical linkage an electrical yaw control system input sensor 42 is operatively connected to linkage 16 adjacent to and at the output of the mechanical mixer 14. The outputs 44 and 46 of the two electrical sensors are connected to an electrical comparator (differential amplifier) 48, the output signal 50 of which controls a valve 52 of an electrohydraulic actuator 54 that is pinned to aircraft structure at one end. The electrohydraulic actuator piston 56 of actuator 54 is pivotally connected at 58 to the bifurcated upper end of secondary input link 24.

A centering spring 59, FIG. 2, is provided in a cylinder 60 which is pivotally connected by a rod 62 to fixed aircraft structure at 64. An actuating rod 66, loaded by spring 59, is pivoted at 68 to the lower end of walking beam 18 at a point just above pivot 28 for input rod 26. The spring within the cylinder 60 is preset to have a zero load at a position of the rod 66 which corresponds to a selected positive pitch setting of the tail rotor blades to automatically adjust the blade pitch and provide directional control of the helicopter in the event that the linkage between the controls after the input sensor 42 and walking beam 18 is severed at any point. This centering spring and its function are fully disclosed and claimed in a copending application of James C. Dean, Ser. No. 819,578, filed Apr. 28, 1969, and assigned to the assignee of this application.

In the operation of our invention, movements of the pilot's pedals 10 are coupled through secondary servo 12, mechanical mixer 14, linkage 16 and walking beam 18 to shaft 34 which is directly connected to the input of the primary servo of the tail rotor. As rod 26, which is the terminal member of linkage 16, moves the walking beam about its axis A-A spring biased rod 66 is also moved to vary the compression of the spring in cylinder 60. This movement of rod 66 has no effect, however, on the normal operation of the control system through linkage 16 except that the spring beneficially takes out the backlash in the linkage due to play in the bearings and pivots of the linkage. The spring does not, however, bias out play at the spring's neutral position where force is not available to push the system to either side. Also when passing through the neutral position the play bias position changes from one extreme of the play to the other, thus producing a control error. The spring also does not compensate for induced control errors due to fuselage bending or fuselage thermal expansion and contraction. Thus the centering spring alone is not capable of producing a high resolution control system.

Yaw control system input sensor 42 generates an output voltage which is proportional to the displacement of the mechanical mixer output. Likewise the tail rotor servo output sensor 40 generates a voltage output which is proportional to the actual mechanical movement of the tail rotor servo input control rod 34. By comparing these voltages in comparator 48 a resultant voltage signal is obtained which, when applied to secondary input link actuator 54, will cause secondary input link 24 to apply the required correcting motion to walking beam 18 and rod 34 to produce perfect resolution in the control system under all conditions of flight.

If the control linkage 16 should be severed at any point along its length, the centering spring 59 will move the tail rotor pitch to a fixed trim position and the pivot for the walking beam 18 at its lower end becomes a fixed pivot about axis C-C. Input motions of link 24 then pivot walking beam 18 about axis C-C and position the primary servo, thereby providing yaw control of the helicopter. The authority of secondary input link 24 is increased above normal system operation by thus locating the fixed pivot point 28 for the walking beam nearer pivot 20 for the latter on link 24. This amounts to about 20 percent increase in the capability of input link 24, in the mechanism illustrated, which gives the pilot ample control to fly the aircraft safely back to base.

It will be evident that by this invention we have made it possible to reduce the control error between the mechanical mixer and the primary control servo and thereby materially improve aircraft performance. Also we have made it possible to compensate for induced control inputs caused by fuselage bending and thermal expansion and contraction of the fuselage.

We claim:

1. A high resolution tail rotor pitch control system for helicopters including in combination a first movable input member, a movable output member, means responsive to movement of said input member for providing a first electrical signal, means responsive to movement of said output member for providing a feedback signal, means for comparing said first and feedback signals to provide an error signal, and means responsive to movement of said first movable input member and to the error signal for positioning said output member including a differential linkage mechanism, said mechanism including a second input link responsive to said error signal pivoted on fixed aircraft structure, and a walking beam pivoted intermediate its length on said second input member and operatively connected at points spaced from its pivot on said second input link with both said first movable input member and said output member.

2. A high resolution tail rotor pitch control system including a pilot operated control member, a tail rotor pitch control servo, a mechanical connection between said member and said servo including a walking beam having a pivotal support adjacent said servo and having an operating connection with said servo on one side and an operating connection with said member on the other side of its pivot, an electrical input sensor responsive to movements of said member an electrical output sensor responsive to movements of said walking beam, means for comparing the electrical outputs of said sensors to obtain an error signal, and means responsive to said error signal for providing a corrective movement of said walking beam to produce a high degree of resolution between the movements of said member and said servo.

3. A high resolution tail rotor pitch control system including a pilot operated member, a tail rotor pitch control servo, a mechanical connection between said member and said servo including a walking beam pivoted adjacent said servo and having an operating connection with said servo on one side and an operating connection with said member on the other side of its pivot, an input sensor responsive to movements of said member having an electrical output, an output sensor responsive to movements of said walking beam having an electrical output, means for comparing the electrical outputs of said sensors to obtain an error signal, a secondary input arm pivoted on fixed aircraft structure having an operative connection with said walking beam, and actuating means for said input arm energized by said error signal providing a corrective movement of said walking beam to produce a high degree of resolution between the movements of said member and said servo.

4. The control system of claim 3 in which the walking beam is pivotally mounted intermediate its ends on the secondary input arm.

5. A high resolution tail rotor pitch control system for a helicopter including a pilot operated member, an input sensor operatively connected to said member and having an electrical output proportional to movement of said member, a tail rotor pitch control servo, an output sensor operatively connected to said servo and having an electrical output proportional to movement of said servo, input means providing a mechanical connection between said member and said servo including a differential linkage located adjacent said servo, said linkage including a walking beam and a second input member pivoted at one end on fixed aircraft structure, said walking beam being pivoted intermediate its ends on said second input member at a point spaced from the pivotal support of the latter, a differential amplifier receiving the electrical output from both said sensors and producing therefrom an error signal, and an extensible actuator receiving said error signal and having an operative connection with the free end of said second input member.

6. The control system of claim 5 in which said input means includes a linkage having a pivotal connection to one end of said walking beam remote from the pivotal support for the latter, a spring biased centering mechanism including a cylinder pivotally supported on fixed aircraft structure and a spring biased cylinder rod pivotally connected to said walking beam at a point somewhat closer to the pivot of the latter than the pivot of said linkage on said beam.